United States Patent
Wang

(10) Patent No.: US 6,912,486 B2
(45) Date of Patent: Jun. 28, 2005

(54) SYSTEM AND METHOD FOR MONITORING NETWORK APPLIANCES USING WELL-FORMATTED DATA FILES

(75) Inventor: Bing Wang, San Jose, CA (US)

(73) Assignee: Nokia Inc., Irving, TX (US)

( * ) Notice: Subject to any disclaimer, the term of this patent is extended or adjusted under 35 U.S.C. 154(b) by 0 days.

(21) Appl. No.: 10/464,359

(22) Filed: Jun. 17, 2003

(65) Prior Publication Data

US 2004/0260519 A1 Dec. 23, 2004

(51) Int. Cl.[7] .............................................. G06F 19/00
(52) U.S. Cl. ..................................... 702/188; 707/205
(58) Field of Search ......................... 702/188, 182–185; 707/205

(56) References Cited

U.S. PATENT DOCUMENTS

| | | | |
|---|---|---|---|
| 2002/0124081 A1 * | 9/2002 | Primm et al. ............... | 709/224 |
| 2003/0065805 A1 * | 4/2003 | Barnes, Jr. ................. | 709/231 |
| 2003/0217283 A1 * | 11/2003 | Hrastar et al. ............. | 713/200 |
| 2004/0103153 A1 * | 5/2004 | Chang et al. ............... | 709/206 |
| 2004/0107405 A1 * | 6/2004 | Schein ........................ | 715/530 |
| 2004/0141201 A1 * | 7/2004 | Shima ........................ | 358/1.15 |

* cited by examiner

Primary Examiner—Marc S Hoff
Assistant Examiner—Edward Raymond
(74) Attorney, Agent, or Firm—Darby & Darby P.C.; Jamie L. Wiegand

(57) ABSTRACT

The present invention provides a system and method for monitoring network appliances using formatted data files. A system for monitoring a network appliance by recording operational data in formatted data files includes a data management module and a data presentation module. The data management module is configured to determine selected operational data associated with the network appliance and to record the selected operational data in formatted data files. The selected operational data are a subset of data regarding transactions performed by the network appliance. The data management module is also configured to record the selected operational data with minimum processing. The data presentation module is configured to present statistical data. The statistical data is determined from the selected operational data in the formatted data files. The data presentation module is also configured to provide the statistical data in real-time.

17 Claims, 8 Drawing Sheets

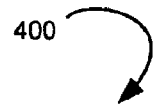

| File magic | | Mj | Vi | 'H' | NItems | 0 | |
|---|---|---|---|---|---|---|---|
| Reserved ||||||||
| ID of Item 0 ||  year | yday | hr | Reserved |||
| Description ||||||||
| ID of Item 1 || year | yday | hr | Reserved |||
| Description ||||||||
| ID of Item 1 || year | yday | hr | Reserved |||
| Description ||||||||
| ... (up to number of fields) ||||||||
| 4 | S | 0 | Yr | M | D | Reserved ||
| Value of Item 0 |||| Value of Item 1 ||||
| Value of Item 2 |||| Value of Item 3 ||||
| ... (up to number of fields) ||||||||
| 4 | S | 1 | Yr | M | D | Reserved ||
| Value of Item 0 |||| Value of Item 1 ||||
| Value of Item 2 |||| Value of Item 3 ||||
| ... (up to number of fields) ||||||||
| 4 | S | 2 | Yr | M | D | Reserved ||
| Value of Item 0 |||| Value of Item 1 ||||

...

| 4 | S | 23 | Yr | M | D | Reserved ||
| Value of Item 0 |||| Value of Item 1 ||||
| Value of Item 2 |||| Value of Item 3 ||||
| ... (up to number of fields) ||||||||

FIG. 4

| File magic | | Vj | Vi | 'D' | NItem | Year | |
|---|---|---|---|---|---|---|---|
| Reserved ||||||||
| ID of Item 0 || year | yday | hr | Reserved |||
| Description ||||||||
| ID of Item 0 || year | yday | hr | Reserved |||
| Description ||||||||
| ID of Item 0 || year | yday | hr | Reserved |||
| Description ||||||||
| ... (up to number of fields) ||||||||
| 1 | S | Year | Reserved |||||
| Yearly total of Item 0 ||| Yearly total of Item 1 |||||
| Yearly total of Item 2 ||| Yearly total of Item 3 |||||
| ... (up to number of fields) ||||||||
| 2 | S | 1 | Reserved |||||
| Total of Item 0 in Jan ||| Total of Item 1 in Jan |||||
| Total of Item 2 in Jan ||| Total of Item 3 in Jan |||||
| ... (up to number of fields) ||||||||
| 2 | S | 2 | Reserved |||||
| Total of Item 0 in Feb ||| Total of Item 1 in Feb |||||

...

| 2 | S | 12 | Reserved |||||
|---|---|---|---|---|---|---|---|
| Total of Item 0 in Dec ||| Total of Item 2 in Dec |||||
| Total of Item 2 in Dec ||| Total of Item 2 in Dec |||||
| ... (up to number of fields) ||||||||
| 3 | S | 1 | 1 | 1 | 7 | ds | gmtoff | Reserved |
| Value of Item 0 in Jan 1 ||||| Value of Item 1 in Jan 1 |||
| Value of Item 2 in Jan 1 ||||| Value of Item 3 in Jan 1 |||
| ... (up to number of fields) ||||||||
| 3 | S | 2 | 1 | 2 | 7 | ds | gmtoff | Reserved |
| Value of Item 0 in Jan 2 ||||| Value of Item 1 in Jan 2 |||
| Value of Item 2 in Jan 2 ||||| Value of Item 3 in Jan 2 |||
| ... (up to number of fields) ||||||||

...

| 3 | S | 365 | 12 | 31 | 7 | ds | gmtoff | Reserved |
|---|---|---|---|---|---|---|---|---|
| Value of Item 0 in Dec 31 ||||| Value of Item 1 in Dec 31 |||
| Value of Item 2 in Dec 31 ||||| Value of Item 3 in Dec 31 |||
| ... (up to number of fields) ||||||||

FIG. 5

SYSTEM AND METHOD FOR MONITORING NETWORK APPLIANCES USING WELL-FORMATTED DATA FILES

BACKGROUND OF THE INVENTION

In recent years, there has been a dramatic upsurge in the popularity of electronic communication in business and home applications. The number of networks and the volume of data continue to increase at a rapid rate. To cope with the ever-increasing demand for faster, more secure and more far-reaching networks, a variety of network appliances are being used to meet these demands.

Network appliances in the network are constantly monitored to identify problems and upgrade opportunities in order to help ensure the integrity and to maintain the optimal performance of a network. Statistical data are often used to accomplish these goals. For example, a network administrator may monitor the throughputs of a message protector appliance in different time ranges to determine whether the appliance is performing properly and whether the appliance is being overloaded. Statistical data of parameters such as the number of emails, the total size of the processed emails, and the number of emails containing virus or exploits are useful to an administrator for analyzing the performance of the message protector appliance.

One common method of gathering statistical data on network appliances is by logging data. A logging system is typically used to record data into log files. The data is used to record the details of all transactions associated with the network appliances. The details of a transaction are generally included in an entry, which is usually identified by a time. Later, if statistical data of certain time period are requested, the system parses the log files and calculates the parameters of interest by analyzing each entry that falls in the time period.

A significant drawback of this approach is that huge amount of data are involved. For example, a message protector appliance can process tens of thousands of emails per hour. To determine how many emails were processed in any one-hour period, the system has to parse through tens of thousands of log records, which is a resource-intensive and time-consuming proposition. Statistical data for longer periods such as months or years would take even longer to compute. Thus, in such a system, providing real-time statistical data is simply impractical.

Another method for gathering statistical data on network appliances is by entering statistically significant data of transactions into an actual database. There are at least two major drawbacks to this method. First, having an actual database adds significant monetary cost and operational resource requirements to a network for merely monitoring network appliances. Second, performing real-time database operations requires a level of computational overhead that is all but prohibitive in most applications.

An extendable monitoring system that can efficiently and reliably provide statistical data on network appliances eludes those skilled in the art.

SUMMARY OF THE INVENTION

The present invention is directed at a system and method for monitoring network appliances using well-formatted data files. In one aspect, the invention is directed at a system for monitoring a network appliance by recording operational data in well-formatted data files. The system includes a data management module and a data presentation module. The data management module is configured to determine selected operational data associated with the network appliance and to record the selected operational data in well-formatted data files. The selected operational data are a subset of data regarding transactions performed by the network appliance. The data management module is also configured to record the selected operational data with minimum processing. The data presentation module is configured to present statistical data. The statistical data is determined from the selected operational data in the well-formatted data files. The data presentation module is also configured to provide the statistical data in real-time.

The selected operational data may be recorded in hourly well-formatted data files and daily well-formatted data files. To enhance system efficiency, monthly and yearly summaries may be recorded in daily well-formatted data files. Flags may be used to indicate whether data are available for a particular time range and whether that time range is currently active.

In another aspect, the invention is directed at a method for monitoring a network appliance using well-formatted data files. The method determines selected operational data associated with the network appliance where the selected operational data is a subset of the data related to transactions performed by the network appliance. The method records the selected operational data in well-formatted data files with minimum processing and determines statistical data from the selected operational data using the well-formatted data files. The statistical data are provided in real-time.

In still another aspect, the invention is directed at a computer-readable medium that includes a well-formatted data file. The well-formatted data file contains selected operational data that are associated with a network appliance and has at least three data fields. The first data field has a main header that uniquely identifies the well-formatted data file. The second data field identifies items included in the operational data. The third data field contains entries with data that are associated with the items identified by the second data field.

In yet another aspect, the invention is directed at a computer-readable medium that includes an hourly well-formatted data file and a daily well-formatted data file. The hourly well-formatted data file contains selected operational data associated with a network appliance. The selected operation data is associated with the performance of the network appliance during a twenty-four hour period. The daily well-formatted data file contains selected operational data associated the performance of the network appliance during a one year period.

BRIEF DESCRIPTION OF THE DRAWINGS

FIG. 4 is a graphical representation of an exemplary hourly data file;

FIG. 5 is a graphical representation of an exemplary daily data file

DETAILED DESCRIPTION OF THE PREFERRED EMBODIMENTS

Figure 1:
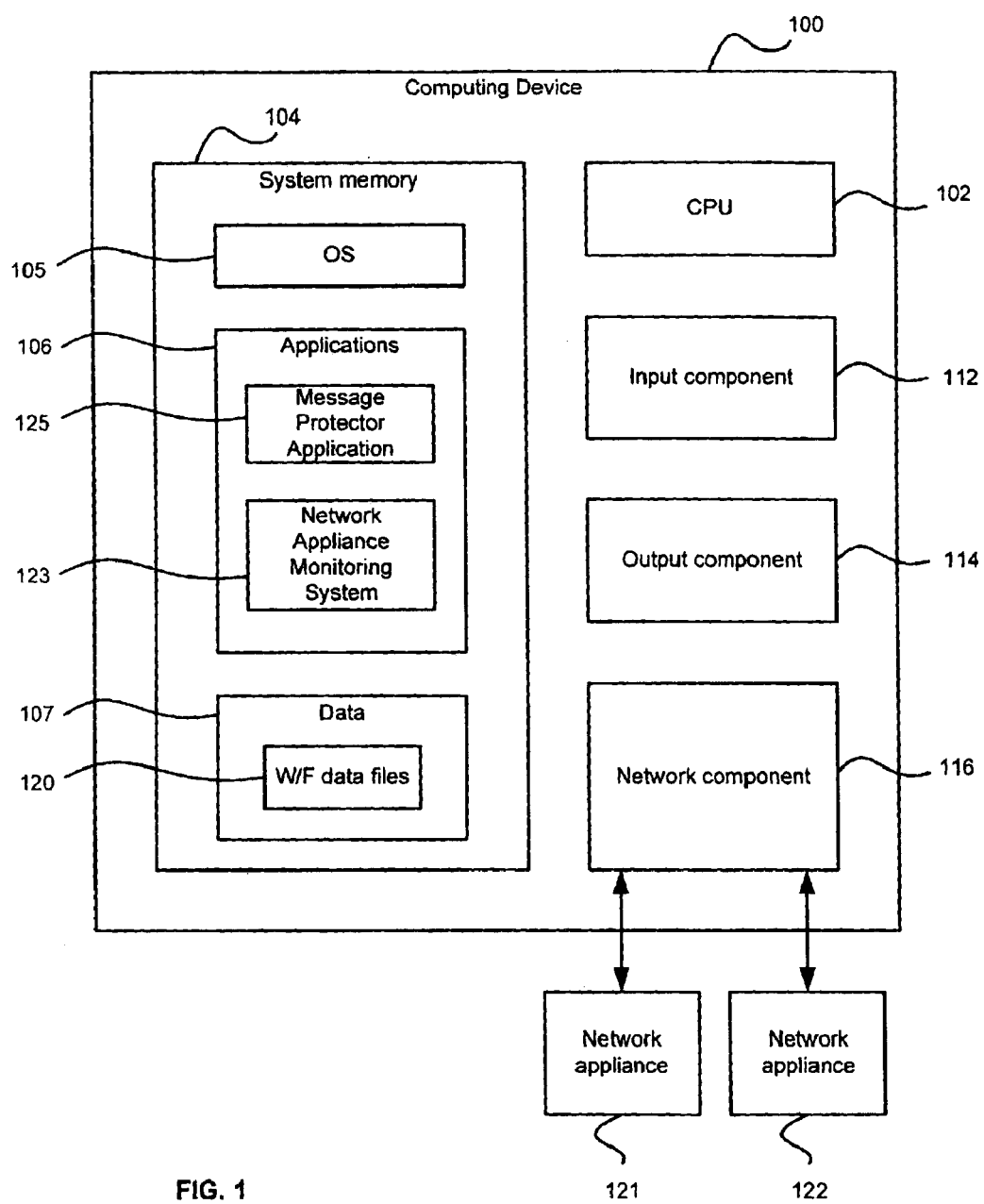
FIG. 1 illustrates an exemplary computing device that may implement a network appliance monitoring system.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "coupled" means either a direct connection between the items connected, or an indirect connection through one or more passive or active intermediary devices. The term "network appliance" means a computing device that is coupled to a network and is designed to perform at least one function relating to the network. The term "message protector application" refers to an application that monitors electronic messages, such as emails, text messaging, and the like.

Referring to the drawings, like numbers indicate like parts throughout the views. Additionally, a reference to the singular includes a reference to the plural unless otherwise stated or is inconsistent with the disclosure herein.

The present invention is directed to a system and method for monitoring network appliances using well-formatted data files. The manner in which data are recorded by this invention is very different from conventional methods. For example, many conventional methods indiscriminately record all details of transactions on a network appliance in a general log file.

In contrast, the present invention does not simply maintain general log files. Instead, the invention records selected operational data in well-formatted data files. Each data file is maintained by a monitoring system and may include hourly, daily, monthly, and yearly operational data of a network appliance. The operational data are selected to yield meaningful statistical data about the network appliance while enabling the data management module of the monitoring system to efficiently record the data. The data files are configured in a well-formatted manner to enable the data presentation module of the monitoring system to quickly determine and provide real-time statistical data about the network appliance. These and other aspects of the invention will become apparent after reading the following detailed description.

FIG. 1 illustrates an exemplary computing device that may implement a network appliance monitoring system, in accordance with one embodiment of the invention. For illustrative purposes, computing device 100 is only shown with a subset of the components that are commonly found in a computing device. A computing device that is capable of implementing this invention may have more, less, or different components as those shown in FIG. 1. Computing device 100 may include various hardware components. In a very basic configuration, computing device 100 typically includes central processing unit 102, system memory 104, and network component 116.

Depending on the exact configuration and type of computing device, system memory 104 may include volatile memory, non-volatile memory, data storage devices, or the like. These examples of system memory 104 are all considered computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may include input component 112 for receiving input. Input component 112 may include a keyboard, a touch screen, a mouse, or other input devices. Output component 114 may include a display, speakers, printer, and the like.

Computing device 100 may also include network component 116 for communicating with other devices in a network, which may be LAN, WAN, the Internet, and any IP and wireless networks. In particular, network component 116 enables computing device 100 to communicate with other computing devices, such as network appliances 121–122. Computing device 100 may be configured to use network component 116 to receive and send packets to and from network appliances 121–122. The communication may be wired or wireless.

Signals sent and received by network component 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Software components of computing device 100 are typically stored in system memory 104. System memory 104 typically includes an operating system 105, one or more applications 106, and data 107. As shown in the figure, applications 106 may include network appliance monitoring system 123 and message protector application 125. Message protector application 125 may be used to implement computer device 100 as a message protector network appliance. Data 107 may include well-formatted data files, which are maintained by network appliance monitoring system 123.

Network appliance monitoring system 123 is a component configured to monitor one or more network appliances. Network appliance monitoring system 123 may be implemented on the computing device that is being monitored. For example, in one embodiment, computing device 100 is implemented as a message protector network appliance for protecting emails. Network appliance monitoring system 123 may be used to monitor computing device 100 and message protector application 125. In another embodiment, network appliance monitoring system 123 may be implemented on a separate computing device as the one that is being monitored. For example, network appliance monitoring system 123 may be configured to monitor network appliances 121–122.

Network appliance monitoring system 100 is configured to determine operations associated with a network appliance that is being monitored and to record selected operational data to well-formatted data files 120. Network appliance monitoring system 100 is also configured to calculate statistical data from the selected operational data in well-formatted data files 120 and to provide the statistical data to callers.

Figure 2:
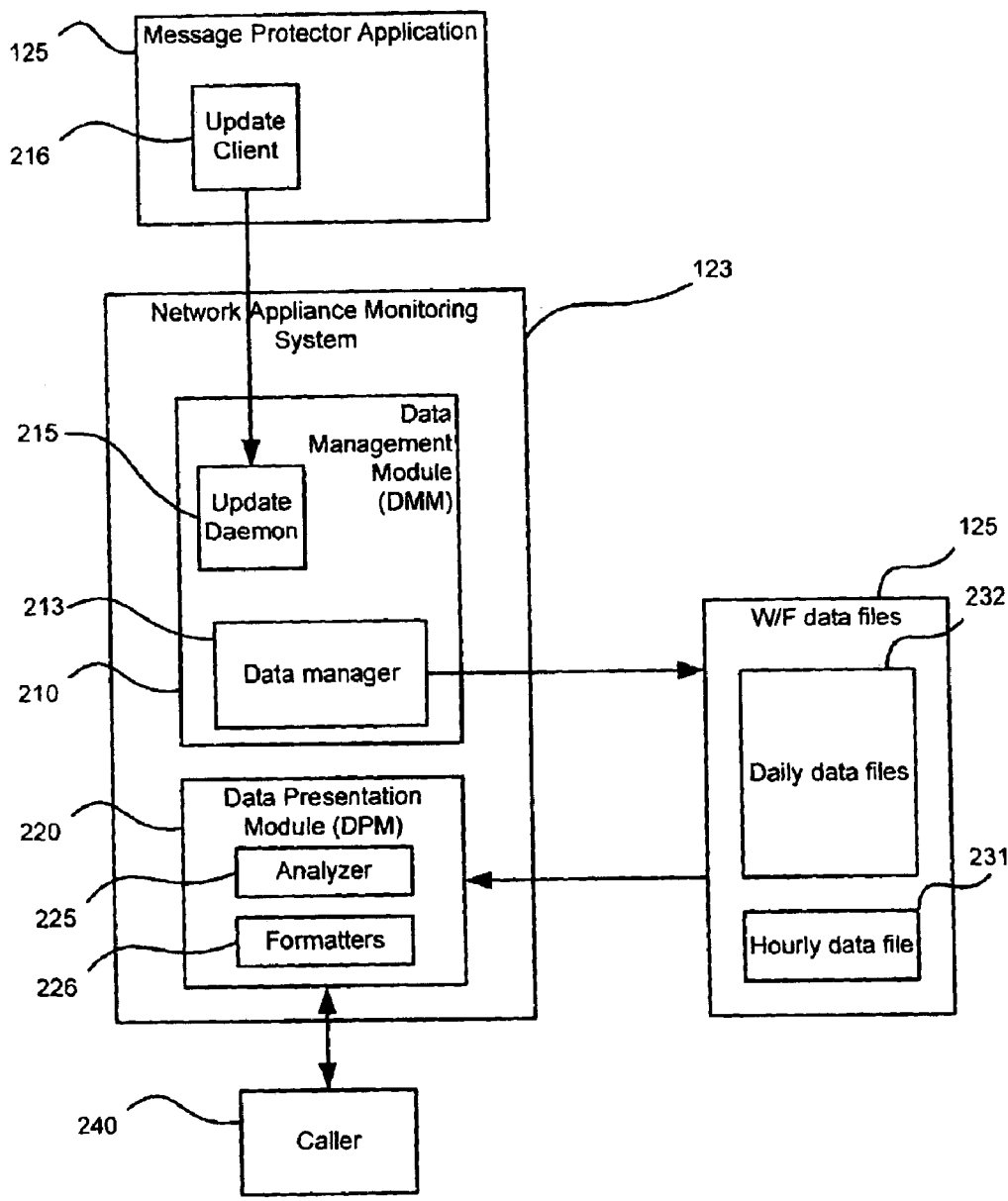
FIG. 2 illustrates the components of a network appliance monitoring system.

FIG. 2 illustrates the components of network appliance monitoring system 123, in accordance with one embodiment of the invention. Network appliance monitoring system 123 may logically be divided into data management module (DMM) 210 and data presentation module (DPM) 220.

DMM 210 is a software component of network appliance monitoring system 123 for handling the gathering and recording of selected operational data that are used for monitoring a network appliance. Selected operational data is a subset of data regarding transactions that are performed by the network appliance. DMM 210 may include data manager 213 and update front end 215–216. Data manager 213 is invoked by update front end 215–216. Data manager 213 is configured to maintain and update well-formatted data files 125. Data manager 213 provides a simple interface to update front end 215–216. To achieve high performance, data manager 213 records the selected operational data with minimum processing.

Update front end 215–216 is a component configured to determine operational data associated with the software component of a network appliance that is being monitored. Update front end 215–216 may be implemented in different ways. In one embodiment, update front end 215–216 is implemented as a client-server pair, where the server is update daemon 215 and the client is update client 216. Update daemon 215 is configured to receive update requests from update client 216, which may be incorporated in a software component in a network appliance that is being monitored.

Update daemon 215 is configured to call update routine in data manager 213 to request for updates. Update daemon 215 is also configured to periodically remind data manager 213 to write the data to well-formatted data files 125. In one embodiment, update front end 215–216 include a message queue update daemon and UDP socket update daemon.

DPM 220 is a component of network appliance monitoring system 100 for determining statistical data and to providing the data to callers, such as caller 240. Using the well-formatted data files 125, the data presentation module is configured to provide the statistical data to the callers in real-time. DPM 220 may include data analyzer 225 and data formatters 226. Data analyzer 225 is configured to determine how much selected operational data in well-formatted data files 125 are needed to provide statistical data in response to a request from a caller. Data analyzer 225 is also configured to read the needed data from well-formatted data files 125 and to perform the necessary computations (e.g. sum up weekly total from daily data, read or sum up the monthly and yearly totals). Data analyzer 225 is further configured to build up a sorted data array with specified number of hourly, daily, weekly, monthly, and yearly data values.

Data formatters 226 may include multiple formatters where each formatter is configured to translate the data value array prepared by data analyzer 226 into a format specified by caller 240. For example, an Extensible Markup Language (XML) formatter may be included to translate the data array into XML format text. A MIB formatter may be included to translate the data array into to some defined MIB variables. To provide consistency, data analyzer 226 may be configured to only read data from well-formatted data files 125, and never to write to them.

For compactness and fast accessing, the well-formatted data files 125 are formatted in a highly organized manner. In one embodiment, data files are restricted to two types: hourly data file 231 and daily data files 232. Only selected operational data are recorded in the data files. Hourly data file 231 stores selected operational data in hourly increments and daily data files 232 store selected operational data in daily increments as well as monthly and yearly totals. An active hourly data file is used for recording operational data up to one day and an active daily data file is used for recording operational data up to one year. Multiple daily files may be kept to maintain records of selected operational data for multiple years.

In one embodiment, one hourly data file and up to 10 daily data files are maintained. Each data entry in the hourly data file is overwritten every 24 hours. The daily data file with the same name is recreated in every 10 years. A hashing function may be used to recycle the filenames of the daily data files.

Each of data files 125 is associated with a version. A data file of one version may have different selected operational data than a data file of another version. To preserve as much data as possible and keep the impacts of any action (e.g. version change and/or clock change) minimum, following principles may be followed by a version converter of DMM 210:

DMM only converts version for current working data files. If the data in an unconverted data file is required, the data analyzer 205 will perform the conversion in memory before reporting, without actually changing the data file.

For the conversion, DMM creates a temporal data file first. DMM replaces the old data file by the new file after all conversions have been finished. Even if the conversion is interrupted, no data would be lost.

During a conversion, the starting time of the items in the item definition entry are copied. The starting time of the new items is the time of the conversion. The starting time of the old items is taken from the old data file. Thus, even with a few version changes during a year, DMM will still able to keep track of whether the value of each individual item is zero or not counted yet at a time.

Figure 3:
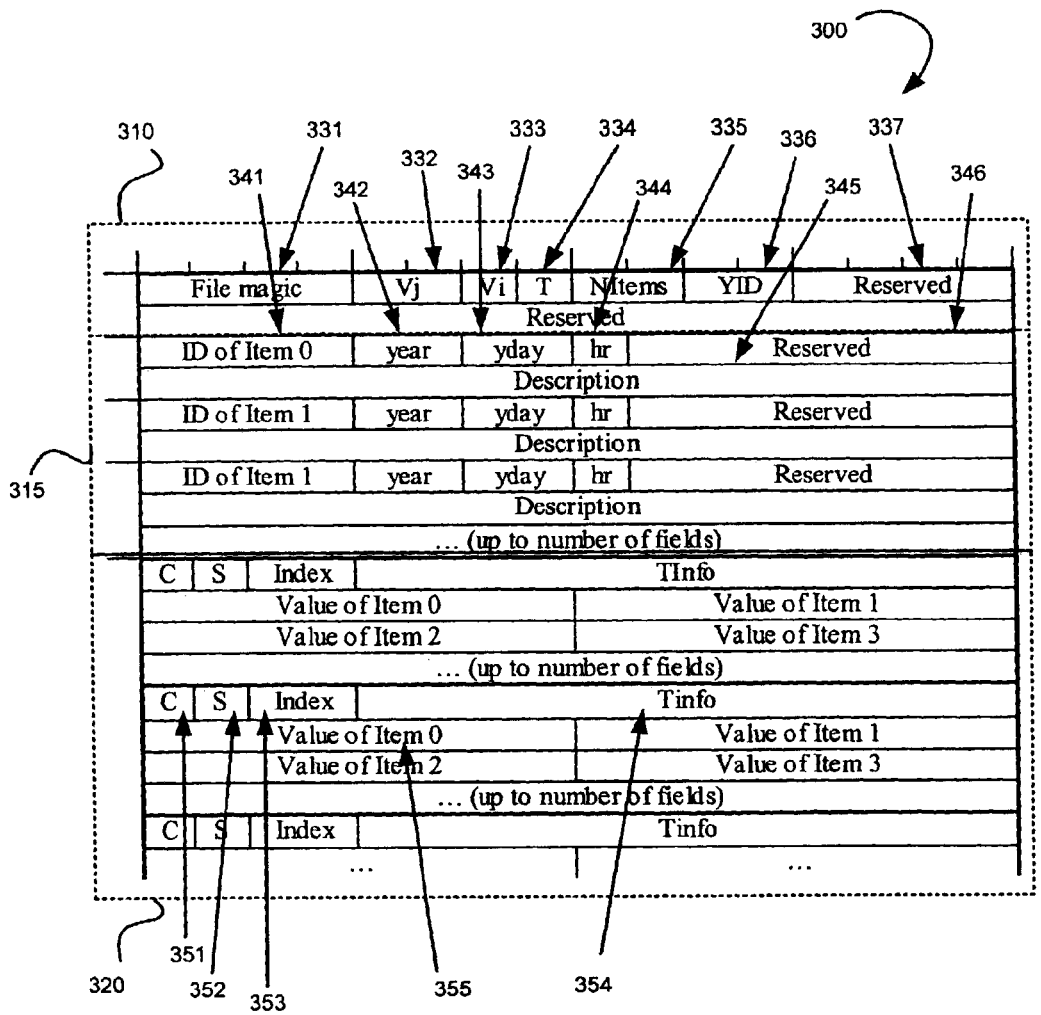
FIG. 3 is a graphical representation of an exemplary well-formatted data file.

FIG. 3 is a graphical representation of an exemplary well-formatted data file, in accordance with one embodiment of the invention. As shown in the figure, data file 300 includes a main header 310, monitor item definition entries 315, and data entries 320. Main header 310, monitor item definition entries 315, and data entries 320 may be of any size and may include many different data fields. In one embodiment, main header 310 is 32 bytes and includes the data fields illustrated in Table 1.

TABLE 1

Main header data fields.

| Data Fields | FIG. Label | Size (bytes) |
| --- | --- | --- |
| File magic | 331 | 4 |
| Major version number | 332 | 2 |
| Minor version number | 333 | 1 |
| File type | 334 | 1 |
| Item count | 335 | 2 |
| Year number | 336 | 2 |
| Reserved | 337 | 20 |

File magic 331 is an identifier that differentiates data file 300 from other files. Major version number 332 and minor version number 333 enable a data presentation module to determine whether data file 300 requires conversion. File type 334 is an identifier of the type of the data file, such as an hourly data file and a daily data file. Item count 335 identifies how many data fields or items are in the data file. Year number 336 is typically only used by daily data files and is set to 0 for hourly data files. Reserved field 337 may be used for any purpose.

Each of the monitor item definition entries 315 may be of any size and may include many different data fields. In this embodiment, each of the monitor item definition entries 315 is 32 bytes and includes the data fields illustrated in Table 2.

TABLE 2

Monitor item definition entries data fields.

| Name | FIG. label | Size (bytes) |
| --- | --- | --- |
| Item ID | 341 | 4 |
| Starting year | 342 | 2 |
| Starting day | 343 | 1 |
| Starting hour | 344 | 1 |
| Short description | 345 | 7 |
| Reserved | 346 | 16 |

Item ID 341 is an identifier that incrementally identifies each item in the data file. Starting year 342 identifies the earliest year with which the data of a particular item are associated. Starting date 343 identifies the earliest day of the starting year with which the data of the item are associated. Starting date 344 identifies the earliest hour of the starting day with which the data of the item are associated. Short description 345 provides a brief explanation of the item. Reserved field 346 may be used for any purpose.

Each of the data entries 320 may be of any size and may include many different data fields. In this embodiment, each of the data entries 320 includes a header that is 16 bytes and one or more data values 355. The header of each of the data entries 320 includes the data fields in illustrated in Table 3.

TABLE 3

Data entry fields.

| Name | FIG. label | Size (bytes) |
| --- | --- | --- |
| Category ID | 351 | 1 |
| Entry state flag | 352 | 1 |
| Index | 353 | 2 |
| Additional time information | 354 | 12 |

Category ID 351 is an identifier that identifies the category of the entries. For example, category ID 351 may identify yearly with a value of 1, monthly with a value of 2, daily with a value of 3, and hourly with a value of 4. Entry state flag 352 is an identifier used by a data management module to mark the state of a specific data entry. Index 353 is the time index of a specific item. For example, index 353 may be 0–23 for hourly data, year number for yearly data, 0–11 for monthly data, and 0–365 for daily data. Additional time information 354 may be used for identifying other time-related information.

FIG. 4 is a graphical representation of an exemplary hourly data file, in accordance with one embodiment of the invention. Hourly data file 400 is a version of data file 300 in FIG. 3 that is particularly tailored for hourly data. As shown in the figure, the data in the Category ID field all have a value of 4 and the data in the index field have values ranged from 0–23. For hourly data file 400, the additional time information in the header of each data entry includes a time stamp. Each time stamp contains a year field with 2 bytes, a month field with 1 byte, a day of the month field with 1 byte and a reserved field with 8 bytes. The time stamps enable a data management module to process only a small portion of data. In the event of a clock-change or a system outage, the data management module can easily resume with minimum impact.

The data of a specific hour is recorded in a corresponding entry. Whenever the data management module starts, it checks the entry for the hour when it is started. If the year, month, and day of the month match, it reads the data from the entry into the cache and takes the entry as the base for the statistical data. Otherwise, the data management module clears the entry.

In one embodiment, the impact of the clock change only applies to the entry of the current hour and other entries are kept intact. This lazy approach ensures that no additional data are lost. For the data presentation module, if the time stamp of an entry is out of range, the data analyzer in the data management module simply discards the entry.

FIG. 5 is a graphical representation of an exemplary daily data file, in accordance with one embodiment of the invention. Daily data file 500 is a version of data file 300 in FIG. 3 that is particularly tailored for daily data. For day entries, the additional time information in the header of each data entry includes a day stamp. Each day stamp contains a month field with 1 byte, day of the month field with 1 byte, a day of the week field with 1 byte, a daylight saving flag with 1 byte, a GMT time offset (may be used to keep time zone information) with 4 bytes, and a reserved field with 4 bytes. The time stamps enable a data management module to process only a small portion of data. In the event of a clock-change or a system outage, the data management module can easily resume with minimum impact.

Daily data file 500 may also include yearly totals 510 and monthly totals 520. Yearly totals 510 and monthly totals 520 are included in daily data file 500 to greatly improve the performance of the data presentation module because monthly totals and yearly totals will likely be frequent requested. Although there are yearly total and monthly total data entries in daily data files, these entries are not updated for each periodical backup to achieve better efficiency and reliability. In other words, monthly and yearly total are considered to be secondary data, and are summed up only in the end of the month or the year.

Since the monthly total and yearly total are considered to be secondary and not a part of periodical backup, an IS_CURR flag is associated with each data entry and is maintained by the data management module to maintain data consistency. The IS_CURR flag enables the network appliance monitoring system to ensure data consistency, especially in the case of unintentional outages of daemon processes. The data presentation module may use the IS_CURR flag to improve system performance. The data presentation module needs to sum up the monthly and yearly total (yearly total is summed up from monthly total) only if the IS_CURR flag is on for the month or the year (which is usually the current month and the current year) during when presenting data.

In addition to IS_CURR state flag, each data entry in the daily data file is also associated with a HAS_DATA flag. The data presentation module may improve system performance by skipping a data entry if the HAS_DATA flag is off. Using this flag, the data management module is able to determine whether data for a time period is not available or just zeros.

Figure 6:
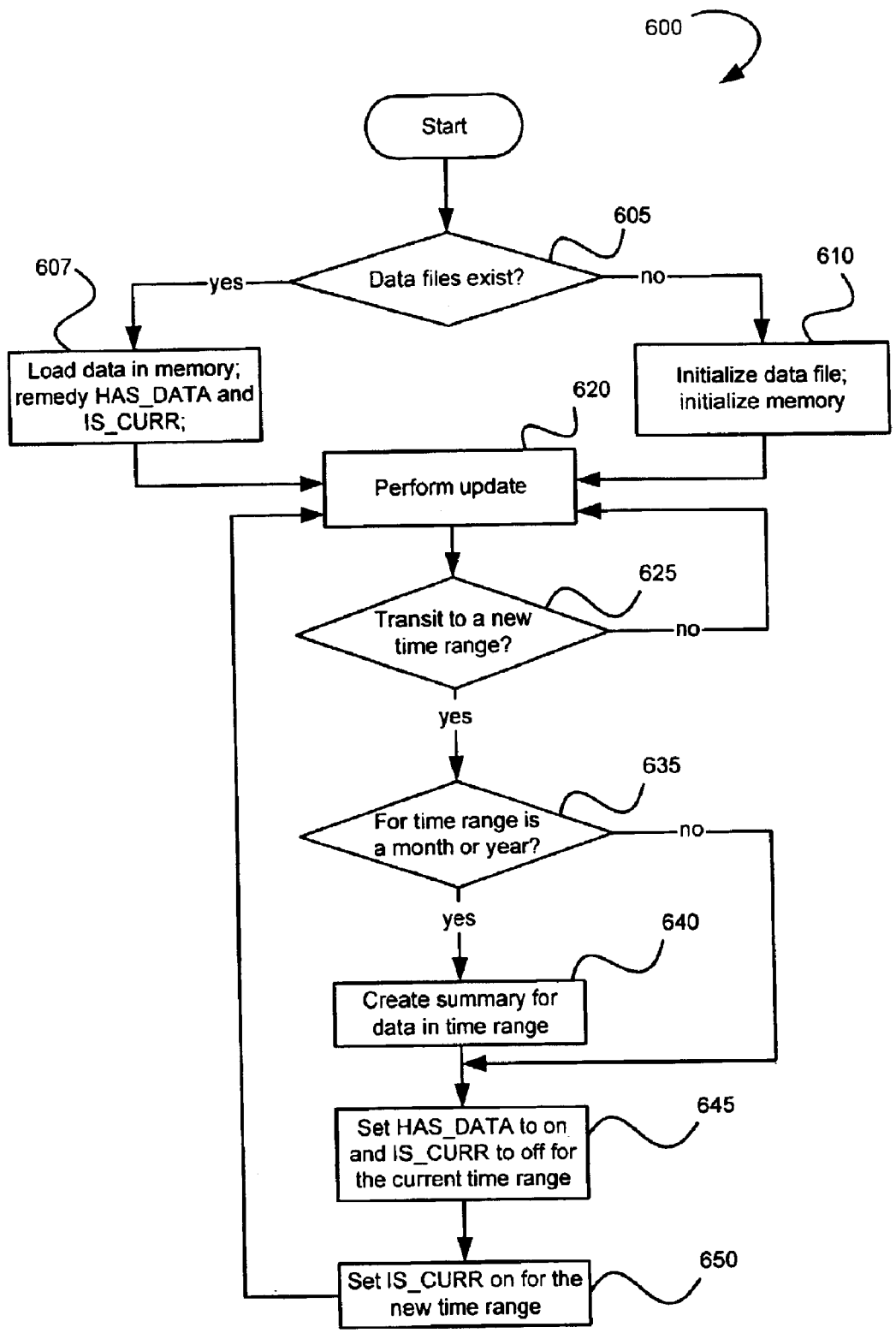
FIG. 6 is an operational flow diagram of an exemplary process that may be used by a data management module to record data in a well-formatted data file.

FIG. 6 is an operational flow diagram of an exemplary process that may be used by a data management module to record data in a well-formatted data file, in accordance with one embodiment of the invention. Moving from a start block, process 600 goes to decision block 605 where a determination is made whether well-formatted date files exist. Data files may have already been created prior to a system termination event. If well-formatted data files exist, process 600 moves to block 607 where the data files are loaded into memory. The HAS_DATA flag and the IS_CURR flag are remedied to reflect the current state of the data in the data files. Process 600 then continues at block 620.

Returning to decision block 605, if well-formatted data files do not exist, process 600 goes to block 610 where a data file and the memory are initialized. At block 620, an update is performed by recording data in the data file. At decision block 625, a determination is made whether the data have been transitioned to a new time range. If the data have not been transitioned to a new time range, process 600 goes back to block 620 where another update is performed.

Returning to decision block 625, if the data have been transitioned to a new time range, process 600 continues at decision block 635 where a determination is made whether the time range is a month or a year. If not, the process continues at block 645.

Returning to decision block 635, if the time range is a month or a year, process 600 continues at block 640 where a summary for the data in the time range is created. The process continues at block 645 where the HAS_DATA flag is set to on and the IS_CURR flag is set to off, for the current time range.

At block 650, the IS_CURR flag is set to on for the new time range. Process 600 then goes back to block 620 to perform another update. The process repeats until an occurrence of a system termination event such as a failure, a restart, a reboot, a shutdown, and the like.

Figure 7:
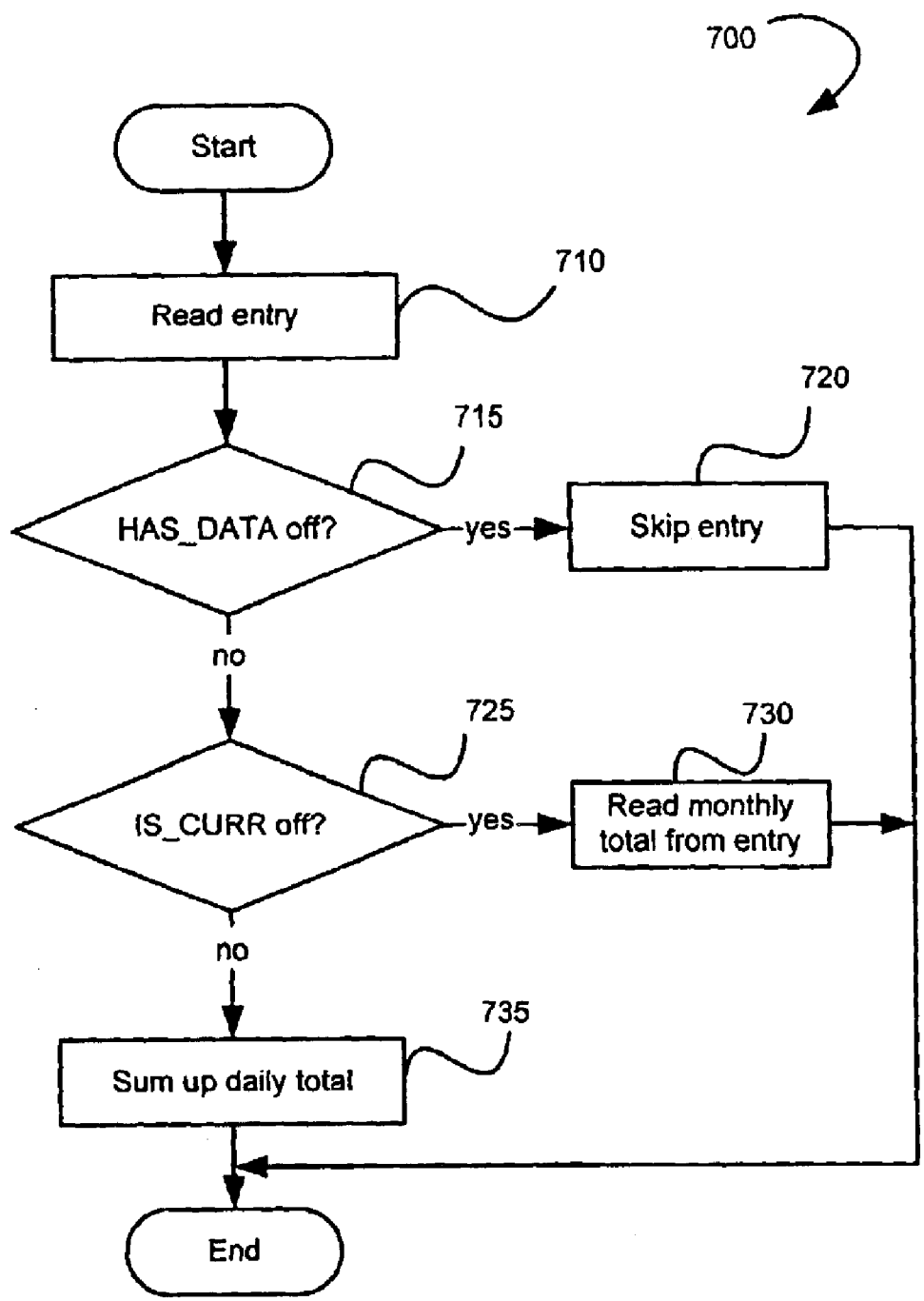
FIG. 7 is an operational flow diagram of an exemplary process that may be used by a data presentation module to generate monthly statistical data using data in a well-formatted data file.
Figure 8:
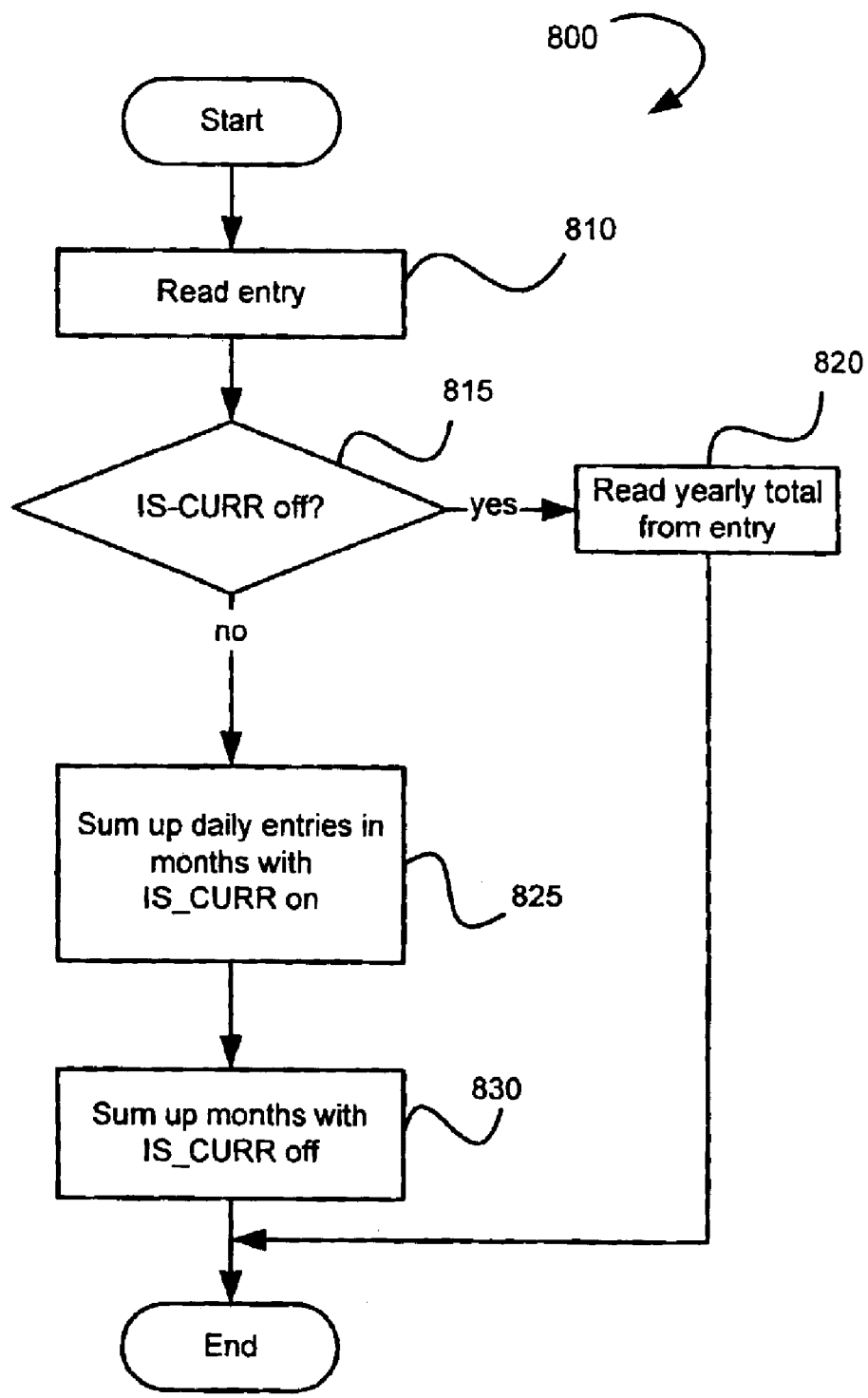
FIG. 8 is an operational flow diagram of an exemplary process that may be used by a data presentation module to generate monthly statistical data using data in a well-formatted data file; in accordance with embodiments of the invention.

FIGS. 7 and 8 are operational flow diagrams of exemplary processes that may be used to generate statistical data using data in well-formatted data files. For illustrative purposes, monthly and yearly statistical data are shown to be generated by two different processes. In practice, monthly and yearly statistical data may be generated using one combined process to improve performance.

FIG. 7 is an operational flow diagram of an exemplary process that may be used by a data presentation module to generate monthly statistical data using data in a well-formatted data file, in accordance with one embodiment of the invention. Moving from a start block, process 700 goes to block 710 where an entry in the data file is read. At decision block 715, a determination is made whether the HAS_DATA flag is off. If so, the entry is skipped and the process ends.

Returning to decision block 715, if the HAS_DATA flag is on, process 700 goes to decision block 725 where a determination is made whether the IS_CURR flag is off. If so, the process moves to block 730 where the monthly total from the entry is read and the process ends.

Returning to decision block 725, if the IS_CURR flag is on, process 700 continues at block 735 where the monthly total is calculated by summing up the daily totals and the process ends.

FIG. 8 is an operational flow diagram of an exemplary process that may be used by a data presentation module to generate yearly statistical data using data in a well-formatted data file, in accordance with one embodiment of the invention. Moving from a start block, process 800 goes to block 810 where an entry in the data file is read. At decision block 815, a determination is made whether the IS_CURR flag is off. If so, the process moves to block 820 where the yearly total from the entry is read and the process ends.

Returning to decision block 815, if the IS_CURR flag is on, process 800 continues at block 825 where the daily entries for the month with IS_CURR flag on is summed up to generate a monthly total. At block 830, yearly total is calculated by summing up all monthly totals and the process ends.

The above specification, examples and data provide a complete description of the invention. Since many embodiments of the invention can be made without departing from the spirit and scope of the invention, the invention resides in the claims hereinafter appended.

What is claimed is:

1. A system for efficiently monitoring a network appliance, comprising:
a formatted data file that is formatted according to at least one predetermined time period; and
a data management module configured to record within the predetermined time period selected operational data associated with the network appliance in predetermined locations within the formatted data file; and to convert a formatted data file to a different format, wherein the data management module ignores existing and inactive formatted data files during the conversion.

2. The system of claim 1, wherein the at least one predetermined time period is selected from at least one of an hourly period, a daily period, a weekly period, a monthly period, and a yearly period.

3. The system of claim 1, wherein the data management module further comprises a data manager configured to maintain and update the formatted data file.

4. The system of claim 1, wherein the data management module includes an update front end configured to receive update requests from an update client.

5. The system of claim 1, further comprising a data presentation module configured to provide statistical data determined from the recorded selected operational data in the formatted data file.

6. The system of claim 5, wherein the data presentation module includes a data analyzer configured to select the requested data from the formatted data file and perform computations to provide the statistical data.

7. The system of claim 6, wherein the data analyzer is further configured to build a sorted data array.

8. The system of claim 7, wherein the data presentation module further comprises a data formatter configured to translate the sorted data array into a specified format.

9. The system of claim 8, wherein the specified format is selected from an XML format and an MIB format.

10. The system of claim 1, wherein the data presentation module is further configured to apply the conversion while providing the statistical data.

11. A method for monitoring a network appliance using minimum processing power, the method comprising:
  determining selected operational data associated with the network appliance; and
  recording the selected operational data in predetermined locations within the formatted data files, wherein recording the selected operational data further comprises:
    determining when to transition from a current time range to a new time range in a formatted data file; and when transitioning the new time range:
    determining statistical data associated with the current time range;
    recording the statistical data in the data files; and
    setting a flag associated with the current time range to indicate availability of the statistical data.

12. The method of claim 11, further comprising
  determining statistical data from the formatted data files; and
  providing the statistical data in real-time.

13. The method of claim 11, further comprising assigning filenames to the formatted data files such that each filename is associated with a time range and the filenames are recycled after a period of time.

14. The method of claim 11, wherein the formatted data files further comprise:
  an hourly formatted data file containing selected operational data being associated with the performance of the network appliance during a twenty-four hour period; and
  a daily formatted data file containing selected operational data associated the performance of the network appliance during a one year period.

15. The method of claim 14, further comprising a yearly formatted data file associated with a year in a multi-year period.

16. An apparatus for efficiently monitoring a network appliance, comprising:
  means for determining selected operational data associated with transactions performed by the network appliance; and
  means for recording the selected operational data in predetermined locations within the formatted data files, wherein the means for recording the selected operational data further comprises:
  a means for determining when to transition from a current time range to a new time range in a formatted data file; and when transitioning the new time range employing:
  a means for determining statistical data associated with the current time range;
  a means for recording the statistical data in the data files; and
  a means for setting a flag associated with the current time range to indicate availability of the statistical data.

17. The apparatus of claim 16, further comprising:
  means for determining statistical data from the selected operational data using the formatted data files; and
  means for providing the statistical data in real-time.

* * * * *

UNITED STATES PATENT AND TRADEMARK OFFICE
CERTIFICATE OF CORRECTION

PATENT NO. : 6,912,486 B2
DATED : June 28, 2005
INVENTOR(S) : Bing Wang

It is certified that error appears in the above-identified patent and that said Letters Patent is hereby corrected as shown below:

Column 3,
Line 12, delete "Embodiments" and insert -- Embodiment --.

Column 2,
Line 64, after "file" insert -- ; --.

Signed and Sealed this

Fifteenth Day of November, 2005

JON W. DUDAS
*Director of the United States Patent and Trademark Office*